US009956915B2

(12) United States Patent
Mitsuta et al.

(10) Patent No.: US 9,956,915 B2
(45) Date of Patent: May 1, 2018

(54) DUMP TRUCK PERIPHERY MONITORING APPARATUS (71) Applicant: KOMATSU LTD., Tokyo (JP)

(72) Inventors: Shinji Mitsuta, Hiratsuka (JP); Shigeru Harada, Chigasaki (JP); Tomikazu Tanuki, Fujisawa (JP); Eishin Masutani, Hiratsuka (JP); Yukihiro Nakanishi, Hiratsuka (JP); Takeshi Kurihara, Hiratsuka (JP); Dai Tsubone, Hiratsuka (JP); Masaomi Machida, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 0 days. days.

(21) Appl. No.: 15/392,458

(22) Filed: Dec. 28, 2016

(65) Prior Publication Data

US 2017/0120823 A1  May 4, 2017

Related U.S. Application Data (62) Division of application No. 13/818,323, filed as application No. PCT/JP2012/063255 on May 24, 2012, now abandoned.

(30) Foreign Application Priority Data

Jun. 7, 2011 (JP) ................................ 2011-127478

(51) Int. Cl.
*B60R 1/00* (2006.01)
*H04N 5/232* (2006.01)
*H04N 7/18* (2006.01)

(52) U.S. Cl.
CPC ......... *B60R 1/002* (2013.01); *H04N 5/23238* (2013.01); *H04N 5/23293* (2013.01);
(Continued)

(58) Field of Classification Search
None
See application file for complete search history.

(56) References Cited

U.S. PATENT DOCUMENTS

| 2006/0274147 A1 | 12/2006 | Chinomi et al. |
| 2010/0092042 A1 | 4/2010 | Asari |

(Continued)

FOREIGN PATENT DOCUMENTS

| CN | 1878299 A | 12/2006 |
| JP | 2005-20502 A | 1/2005 |

(Continued)

OTHER PUBLICATIONS

Press Release titled "Clarion Jointly Develops—Overview Monitoring System with Hitachi Construction Machinery" Feb. 1, 2011 (Accessed Feb. 23, 2017_). http://www.clarion.com/xe/en/newstopics/index_2011/110201_01/index.html.*

(Continued)

*Primary Examiner* — Kevin McInnish
(74) *Attorney, Agent, or Firm* — Global IP Counselors, LLP (57) ABSTRACT

A dump truck having a periphery monitoring apparatus is adapted to display an image of surroundings of the dump truck on a display apparatus. A rearward camera is attached to a vehicle body of the dump truck underneath a vessel of the dump truck and positioned forward of a rear edge portion of the vessel. A rearward camera image captured by the rearward camera includes the rear edge portion of the vessel, an area below the vessel, and an area rearward of the vehicle body. A display control section is configured to display the rear edge portion of the vessel in an upper region of the rearward camera image, to display a ground surface below the vessel in a lower region of the rearward camera image, and to display a vehicle body outer edge line obtained by vertically projecting an outer edge of the vessel onto the ground surface.

5 Claims, 7 Drawing Sheets

(52) U.S. Cl.
CPC ........ *H04N 7/181* (2013.01); *B60R 2300/105* (2013.01); *B60R 2300/607* (2013.01); *B60R 2300/8093* (2013.01)

(56) References Cited

U.S. PATENT DOCUMENTS

| 2011/0234802 | A1 | 9/2011 | Yamada et al. | |
| 2011/0292079 | A1* | 12/2011 | Hosoi | B62D 15/0275 345/632 |

FOREIGN PATENT DOCUMENTS

| JP | 2006-341641 A | 12/2006 |
| JP | 2007-85091 A | 4/2007 |
| JP | 2008-163719 A | 7/2008 |
| JP | 2009-121053 A | 6/2009 |
| JP | 2009-1529966 A | 7/2009 |
| JP | 2009-239674 A | 10/2009 |
| JP | 2010-93605 A | 4/2010 |
| JP | 2011-11620 A | 1/2011 |
| WO | 2006/106685 A1 | 10/2006 |

OTHER PUBLICATIONS

Press Release titled Hitachi Construction Machinery Jointly Develops Overview Monitoring System with Clarion dated Jan. 24, 2011.
Office Action for the corresponding Japanese application No. 2014-115673 dated Apr. 21, 2015.
Office Action for the corresponding Chinese application No. 201280002726.8 dated Aug. 27, 2014.
International Search Report for the corresponding international application No. PCT/JP2012/063255, dated Aug. 21, 2012.

* cited by examiner

DUMP TRUCK PERIPHERY MONITORING APPARATUS

CROSS-REFERENCE TO RELATED APPLICATIONS

This application is a division of U.S. patent application Ser. No. 13/818,323 filed on Feb. 22, 2013, which is a U.S. National phase application of International Application No. PCT/JP2012/063255, filed on May 24, 2012, which claims priority to Japanese Patent Application No. 2011-127478 filed on Jun. 7, 2011. The disclosures U.S. patent application Ser. No. 13/818,323 and Japanese Patent Application No. 2011-127478 are hereby incorporated herein by reference in their entireties.

TECHNICAL FIELD

The present invention relates to a dump truck, and in particular, to a dump truck having a periphery monitoring apparatus which displays a camera image of the surroundings of the large dump truck on a display apparatus.

BACKGROUND ART

Extra-large dump trucks are used for carrying crushed rock at a mine or the like are known. In dump trucks of this type, it is difficult for a driver to grasp the circumstances in the surroundings using side mirrors and the like since the vehicle width is remarkably wide in comparison with a typical truck or the like, and in addition, the length from the front to back is long.

Therefore, in Hitachi Construction Machinery Co., Ltd. press release "Joint Development of 'Overview Monitor System' with Clarion Co., Ltd.", (online), Jan. 24, 2011, (retrieved on Jun. 1, 2011), link <URL: http://www.hitachi-kenki.co.jp/news/press/PR20110121113934973.html>, a periphery monitoring apparatus is proposed where bird's-eye images for the front, left, and right of the work vehicle and a camera image of the rear of the work vehicle are displayed on a display apparatus with an object of a driver simply grasping the circumstances in the periphery. Specifically, the periphery monitoring apparatus of the above-noted Hitachi Construction Machinery Co., Ltd. press release is provided with three cameras which video the front, left, and right of the work vehicle and one rear camera which videos the rear of the work vehicle. The rear camera is disposed below the vehicle body which has a vessel and the ground surface at the rear of the work vehicle appears in the camera image.

SUMMARY

However, in the camera image of the above-noted Hitachi Construction Machinery Co., Ltd. press release, grasping of the positional relationship of the vehicle body and objects in the periphery of the vehicle body (for example, a person, a vehicle, a building, or the like) is not easy since the vehicle body exists upward of the rear camera. That is, it is difficult to determine using the camera image if a person has entered the space below the vehicle body, to what extent that the vehicle body has approached a building, or the like.

The present invention has been carried out in consideration of the circumstances described above and has an object of providing a dump truck having a periphery monitoring apparatus where it is possible to easily grasp the positional relationship of the vehicle body and objects in the periphery of the vehicle body using a camera image.

A dump truck includes a vehicle body, a vessel movably connected to the vehicle body and a periphery monitoring apparatus. The periphery monitoring apparatus is adapted to display an image of the surroundings of the dump truck on a display apparatus. The periphery monitoring apparatus includes a plurality of cameras configured and arranged to capture camera images of the surroundings of the dump truck and a display control section. The plurality of cameras includes a rearward camera that is attached to a vehicle body of the dump truck so as to be disposed underneath a vessel of the dump truck and positioned forward of a rear edge portion of the vessel. The rearward camera is configured and arranged such that a rearward camera image captured by the rearward camera includes the rear edge portion of the vessel, an area below the vessel, and an area rearward of the vehicle body. The display control section is configured to display the rear edge portion of the vessel in an upper region of the rearward camera image, to display a ground surface below the vessel in a lower region of the rearward camera image, and to display a vehicle body outer edge line obtained by vertically projecting an outer edge of the vessel onto the ground surface.

According to dump truck having the periphery monitoring apparatus of the first aspect, it is possible for the driver to easily grasp the positional relationship of the vehicle body which is positioned above the camera and objects in the periphery of the vehicle body (for example, a person, a vehicle, a building, or the like) with the vehicle body outer edge line as a reference. As a result, it is possible to easily determine using the camera image, for example, if a person has entered the space below the vehicle body, to what extent that the vehicle body has approached a building, or the like. As a result, it is possible for the driver to simply grasp the circumstances in the periphery of the work vehicle.

A dump truck of a second aspect is related to the first aspect such that the display control section is further configured to display a bird's eye image of the surroundings of the dump truck based on the camera images captured by the plurality of cameras, and to display a selected one of the camera images adjacent to the bird's eye image.

A dump truck of a third aspect is related to the first aspect such that a horizon line is captured in the rearward camera image. The rear edge portion of the vessel is displayed above the horizon line in the rearward camera image, and the vehicle body outer edge line is displayed below the horizon line in the rearward camera image A dump truck of a fourth aspect is related to the first aspect such that a trapezoidal shape is displayed on the rearward camera image. The trapezoidal shape is formed by the vehicle body outer edge line, a pair of reference lines indicating a vehicle width, and a warning line spaced from the vehicle body outer edge line by a prescribed distance in an outward direction.

A dump truck of a fifth aspect is related to the first aspect such that the vehicle body outer edge line is spaced from the rear edge portion of the vessel in the rearward camera image.

According to the present invention, it is possible to provide a dump truck having a periphery monitoring apparatus where it is possible to easily determine the positional relationship of the vehicle body and objects in the periphery of the vehicle body using a camera image.

DESCRIPTION OF EMBODIMENTS

Below, an embodiment of the present invention will be described by referencing the diagrams. Here, in the description below, "front, back, left, and right" are terms with an operator who is sitting in a driver's seat as a reference, and "vehicle width direction" has the same meaning as "left and right direction".

Overall Configuration of Dump Truck

Figure 1:
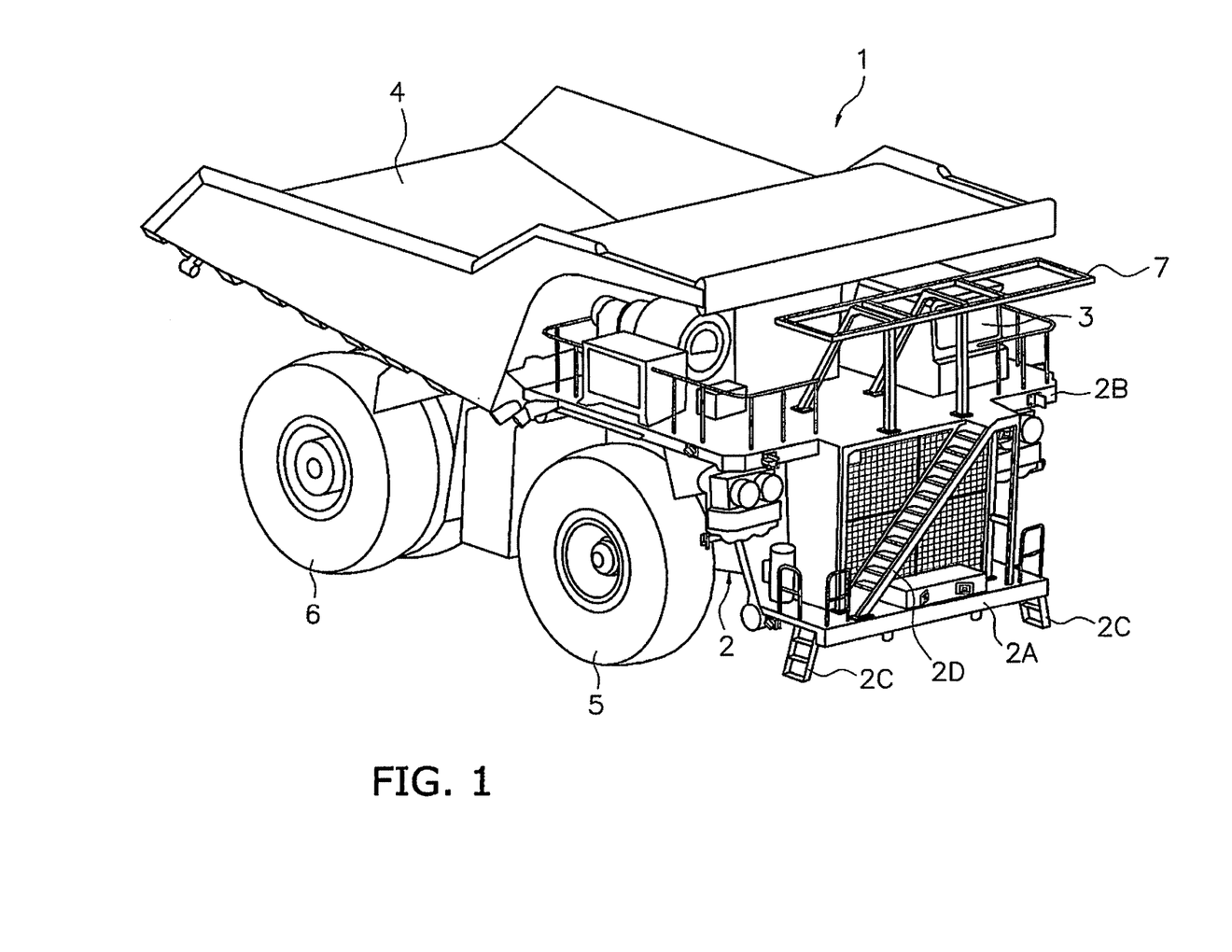
FIG. 1 is a perspective diagram illustrating an overall configuration of a dump truck.

FIG. 1 is a perspective diagram illustrating an overall configuration of a dump truck 1 which is provided with a periphery monitoring apparatus according to an embodiment of the present invention. The dump truck 1 is a self-propulsion type of extra-large work vehicle which is used in mining operations and the like.

The dump truck 1 is mainly provided with a vehicle body frame 2, a cab 3, a vessel 4, two front wheels 5, two rear wheels 6, and a base 7. In addition, the dump truck 1 is provided with a periphery monitoring apparatus 10 which displays an image of the surroundings of the vehicle on a monitor. The configuration of the periphery monitoring apparatus 10 will be described later.

The vehicle body frame 2 supports a diesel engine, a driving mechanism such as a transmission unit, other auxiliary units, and the like which are not shown. In addition, the front wheels 5 (only the right front wheel is shown in the diagram in FIG. 1) are supported in the left and right of the front portion of the vehicle body frame 2, and the rear wheels 6 (only the right rear wheel is shown in the diagram in FIG. 1) are supported in the left and right of the rear portion of the vehicle body frame 2. The vehicle body frame 2 has a lower deck 2A at a side which is close to the ground surface and has an upper deck 2B above the lower deck 2A. Two movable ladders 2C are provided between the lower deck 2A and the ground surface and a sloping ladder 2D is provided between the lower deck 2A and the upper deck 2B. Hand rails with a palisade shape are fixed in the left and right of the front portion, the side portion, and a portion of the back portion on the upper deck 2B.

The cab 3 is disposed to be lateralized towards the left side from the center in the vehicle width direction above the upper deck 2B. A driver's seat, a shift lever, a controller, a monitor, a handle, an acceleration pedal, a brake pedal, and the like are provided in the cab 3. As will be described later, the controller, the monitor, and the shift level configure a portion of the periphery monitoring apparatus 10.

The vessel 4 is a container for hauling heavy materials such as crushed rocks. A bottom portion at the rear side of the vessel 4 is connected to a rear edge portion of the vehicle body frame 2 so as to be able to rotate via a rotation pin (which is not shown). Due to this, it is possible for the vessel 4 to take an erect posture, where loading materials are discharged by the front portion being rotated upward using an actuator such as a hydraulic cylinder which is not shown, and a hauling posture where the front portion is position at an upper portion of the cab as shown in FIG. 1.

The base 7 is disposed above the upper deck 2B. The base 7 is a power supply apparatus for positioning a pantograph which receives electrical power from a bird's-eye wire such as a trolley.

Here, the vehicle body frame 2 and the vessel 4 configure the "vehicle body" of the dump truck 1 in the embodiment.

Configuration of Periphery Monitoring Apparatus

Figure 2:
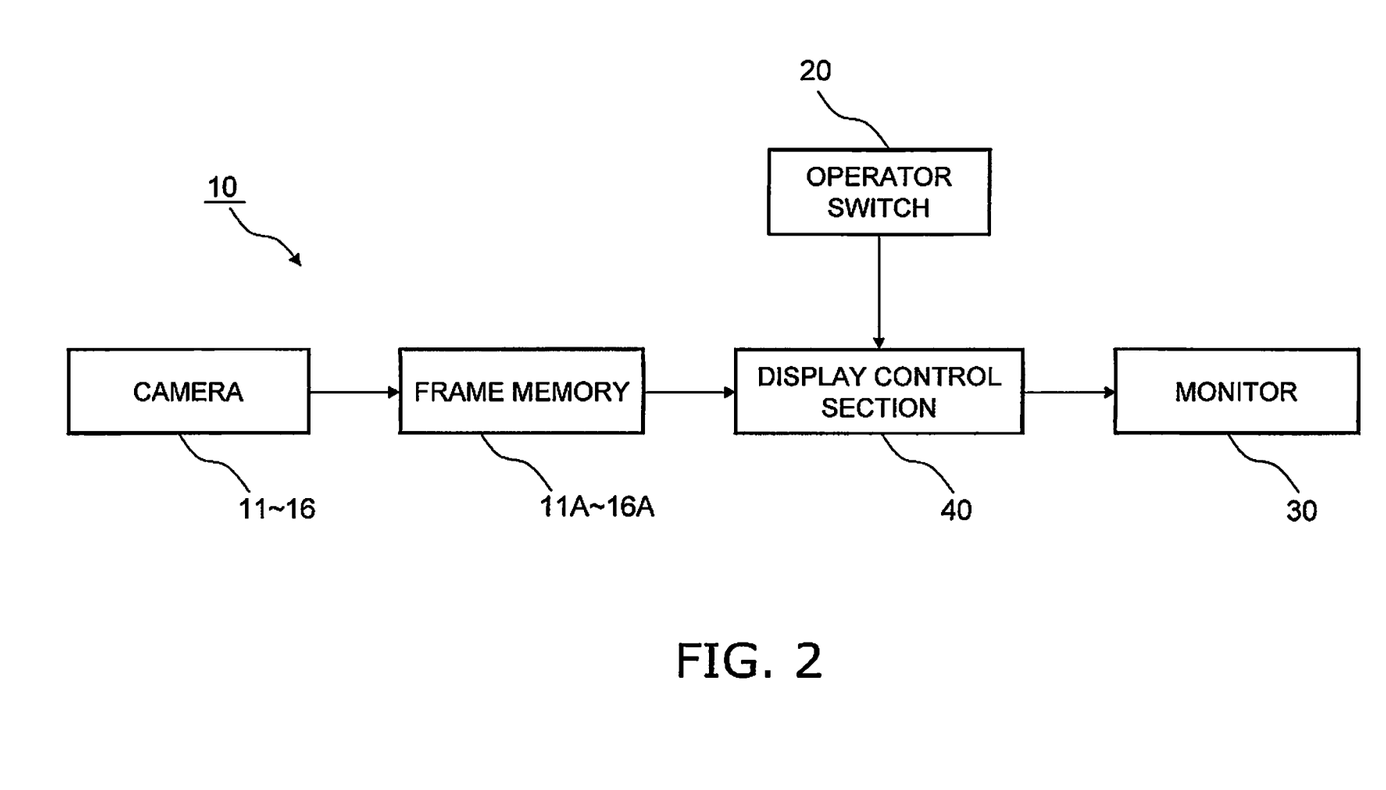
FIG. 2 is a block diagram illustrating a configuration of a periphery monitoring apparatus.

FIG. 2 is a block diagram illustrating a configuration of the periphery monitoring apparatus 10 which is provided in the dump truck 1.

The periphery monitoring apparatus 10 has six cameras 11 to 16, six frame memories 11A to 16A, an operator switch 20, a monitor 30, and a display control section 40.

Cameras

Figure 3:
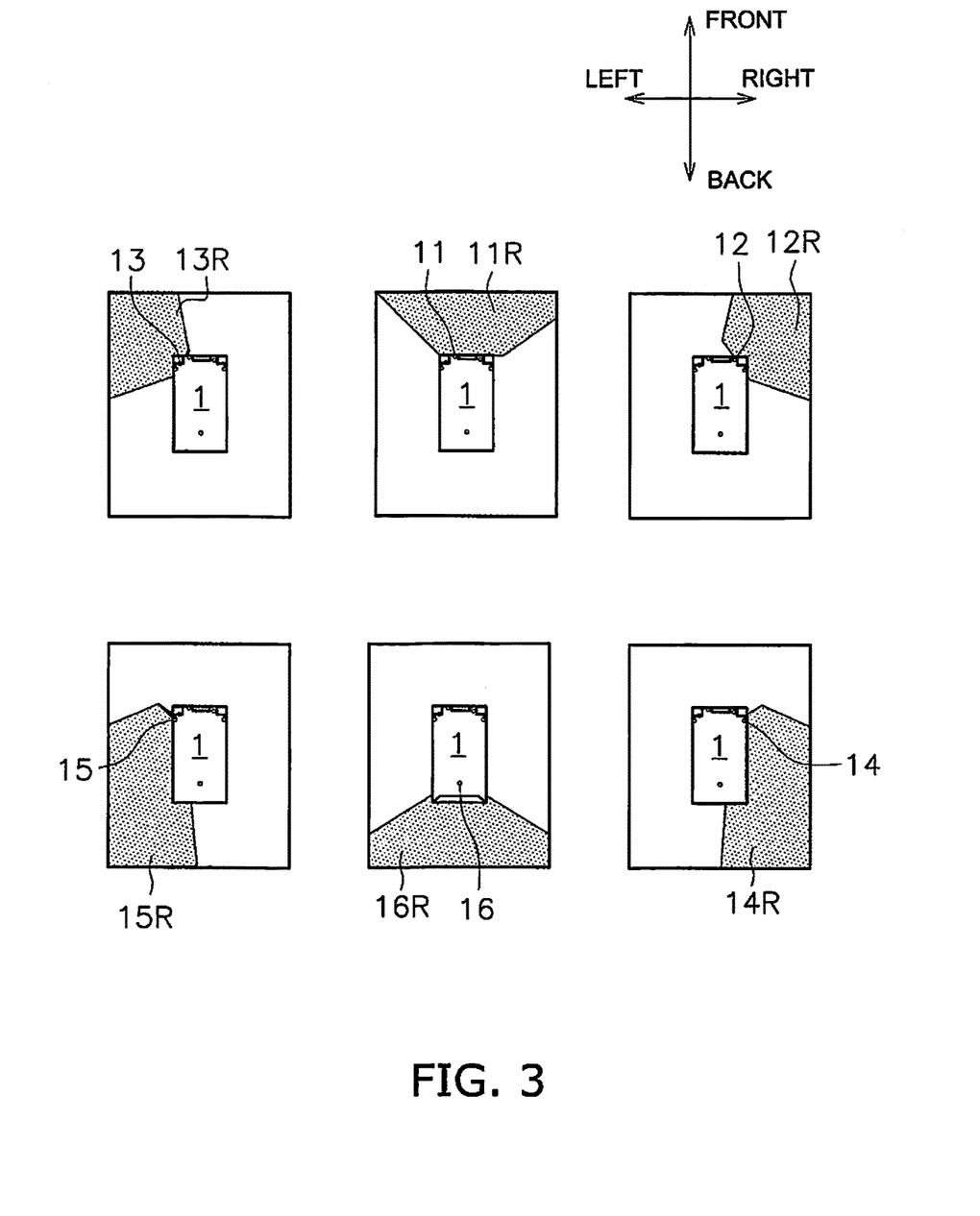
FIG. 3 is a planar diagram of a dump truck which illustrates mounting positions of six cameras and two-dimensional videoing ranges.
Figure 4:
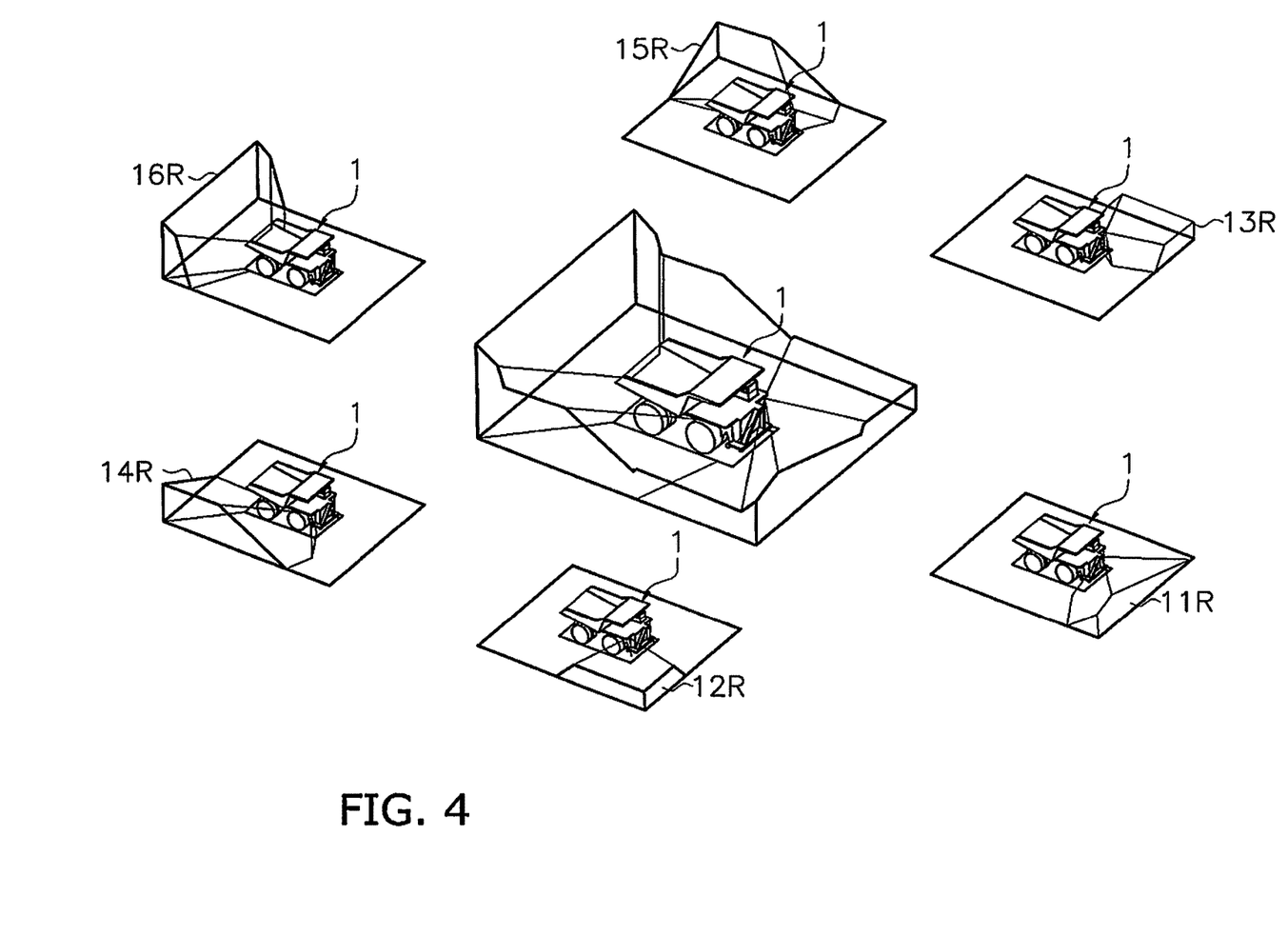
FIG. 4 is a perspective diagram of a dump truck which illustrates three-dimensional imaging ranges using six cameras.
Figure 5:
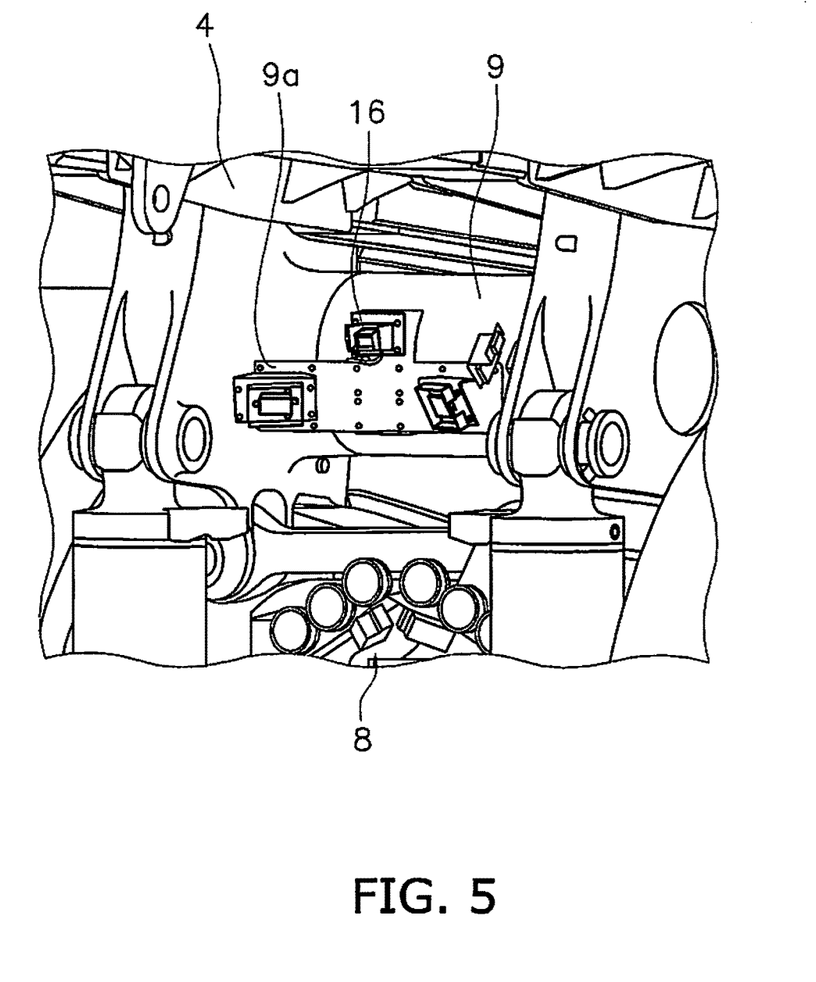
FIG. 5 is a perspective diagram illustrating an attachment state of six cameras.

FIG. 3 is a planar diagram of the dump truck 1 which illustrates mounting positions of the six cameras 11 to 16 and two-dimensional videoing ranges. FIG. 4 is a perspective diagram of the dump truck 1 which illustrates three-dimensional imaging ranges using the six cameras 11 to 16. FIG. 5 is a perspective diagram illustrating an attachment state of the six cameras 11 to 16. The six cameras 11 to 16 are mounted on the outside of the dump truck 1 and acquire images of the surroundings of the dump truck 1.

A first camera 11 is disposed at an upper edge portion of the sloping ladder 2D and is fixed toward the front of the vehicle. A first videoing range 11R of the first camera 11 is the front of the vehicle.

A second camera 12 is disposed at a right edge portion on a front side surface of the upper deck 2B and is fixed toward the front right diagonal of the vehicle. A second videoing range 12R of the second camera 12 is the front right diagonal of the vehicle.

A third camera 13 is disposed at a position which is left and right symmetrical with the second camera 12, that is, a left edge portion on a front side surface of the upper deck 2B and is fixed toward the front left diagonal of the vehicle. A third videoing range 13R of the third camera 13 is the front left diagonal.

A fourth camera 14 is disposed at a front edge portion on a right side surface of the upper deck 2B and is fixed toward the rear right diagonal of the vehicle. A fourth videoing range 14R of the fourth camera 14 is the rear right diagonal.

A fifth camera 15 is disposed at a position which is left and right symmetrical with the fourth camera 14, that is, a front edge portion on a left side of the upper deck 2B and is fixed toward the rear left diagonal of the vehicle. A fifth videoing range 15R of the fifth camera 15 is the rear left diagonal.

A sixth camera 16 is disposed to be beneath the vessel 4 as shown in FIG. 5 and is fixed toward the rear of the vehicle. Specifically, the sixth camera 16 is fixed by a bracket 9a which is attached to a cross bar 9 above a rear axel 8. The sixth camera 16 is fixed diagonally downward toward the rear and a sixth imaging range 16R of the sixth camera 16 is the rear of the vehicle below the vessel 4. Here, in the embodiment, the vehicle body itself (the rear edge portion of the vessel 4) is included in the sixth imaging range 16R of the sixth camera 16 (refer to FIG. 6) which is different to the imaging range images of the other cameras.

Images of substantially the entire surroundings of the dump truck 1 are acquired using the six cameras 11 to 16 above. Each of the six cameras 11 to 16 respectively transmit camera image data, which indicates the camera image which is videoed by the apparatus itself, to the frame memories 11A to 16A.

Frame Memories

The six frame memories 11A to 16A are connected to the six cameras 11 to 16. The six frame memories 11A to 16A temporarily store the camera image data which is received from the six cameras 11 to 16. The six frame memories 11A to 16A transmit the camera image data which has been stored to the display control section 40.

Operator Switch

The operator switch 20 is an operating member for specifying the camera image, which is to be displayed on the monitor 30, out of the camera images from each of the six cameras 11 to 16. It is possible for a desired camera image to the displayed on the monitor 30 by the driver operating the operator switch 20. The operator switch 20 notifies the display control section 40 whether any of the camera images has been selected.

Monitor

Figure 6:
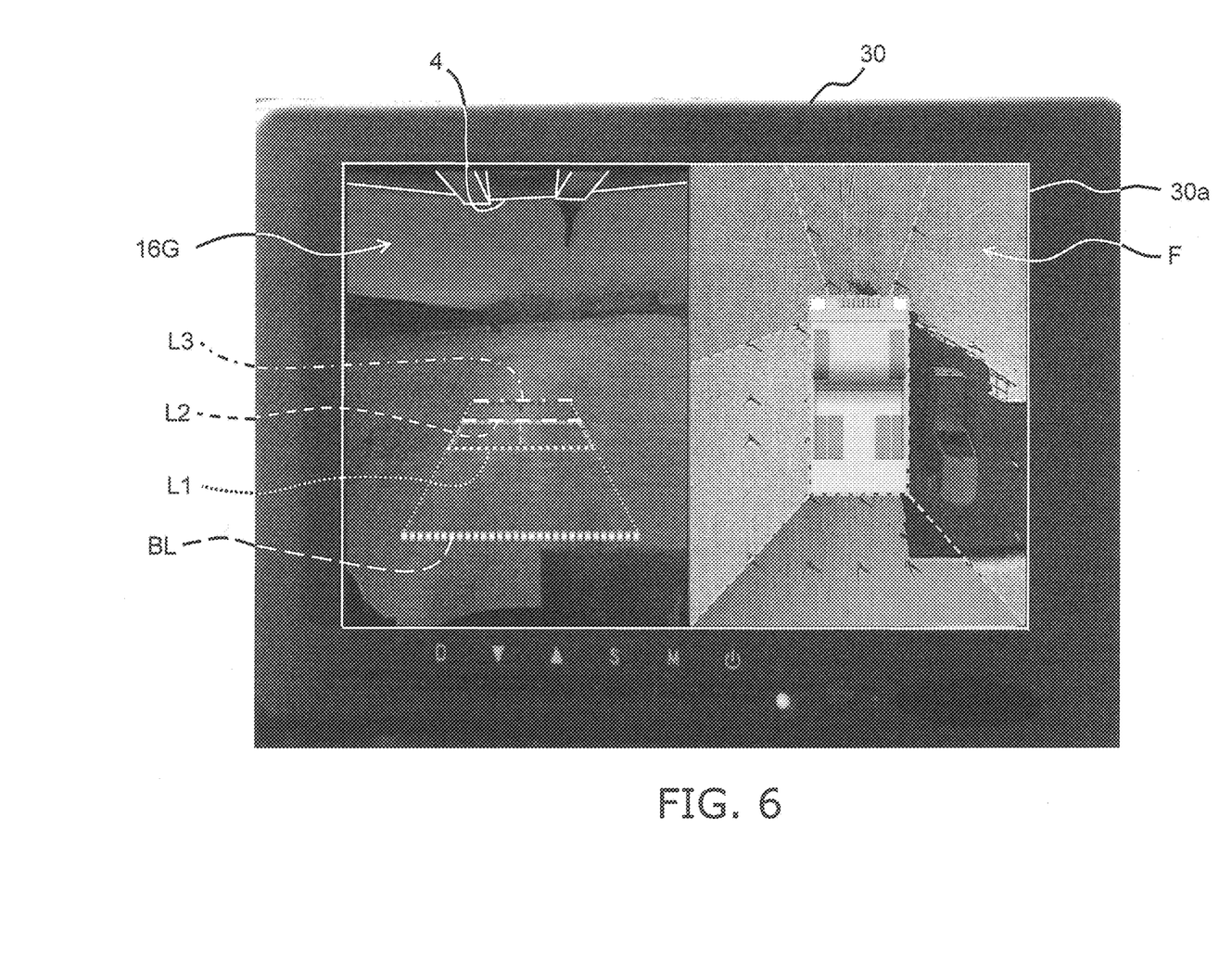
FIG. 6 is a schematic diagram illustrating a configuration of a monitor.
Figure 7:
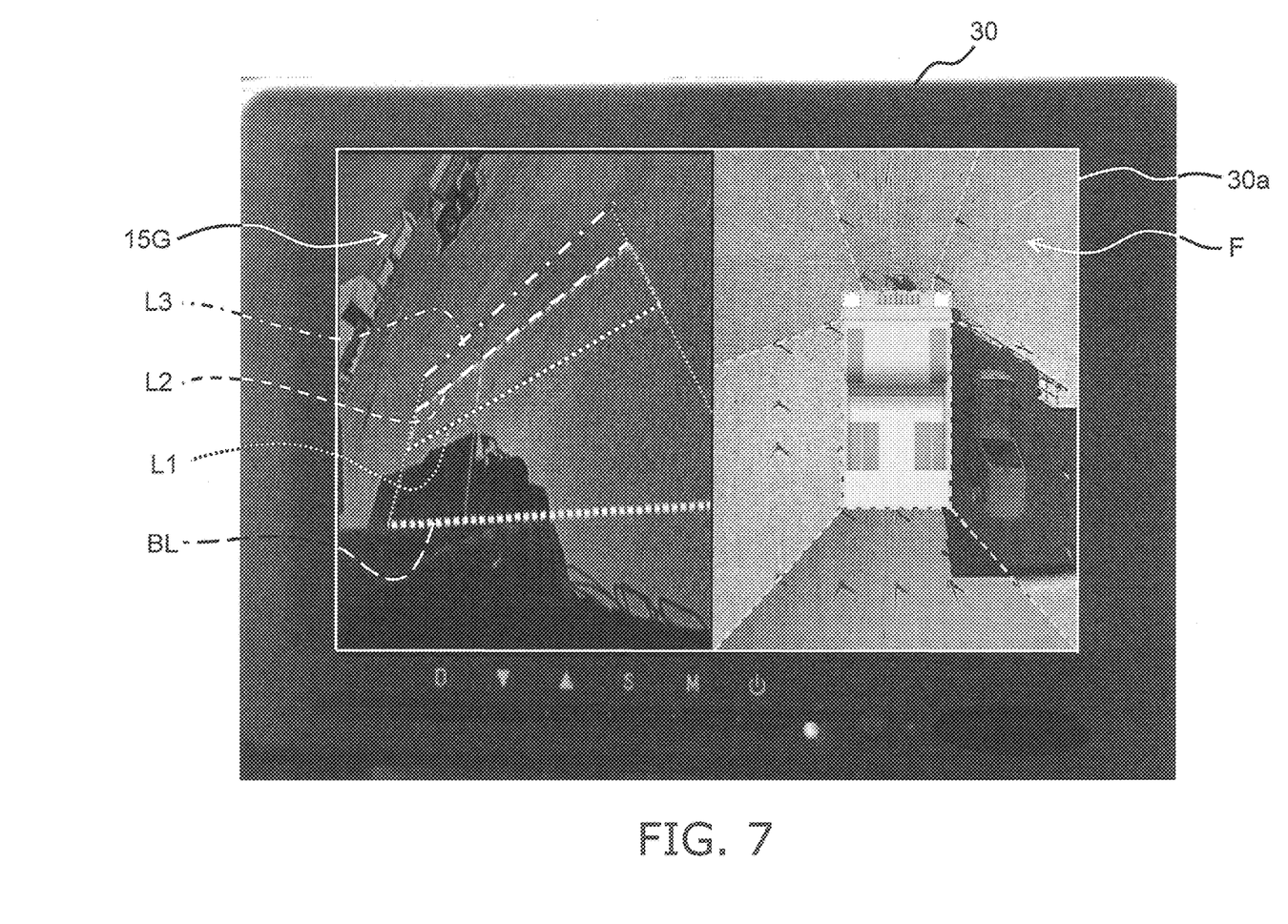
FIG. 7 is a schematic diagram illustrating a configuration of a monitor.

FIG. 6 and FIG. 7 are schematic diagrams illustrating a configuration of the monitor 30.

The monitor 30 is disposed in front of the driver's seat in the cab 3. The monitor 30 has a display region 30a which displays the camera image as shown in FIG. 6 and FIG. 7. Here, FIG. 6 shows an appearance where a camera image 16G of the sixth camera 16 and a bird's-eye image F are displayed in the display region 30a. FIG. 7 shows an appearance where a camera image 15G of the fifth camera 15 and the bird's-eye image F are displayed in the display region 30a.

Here, a plurality of camera images may be displayed in the display region 30a or only the bird's-eye image F may be displayed in the display region 30a. In this manner, the display of the monitor 30 may be automatically switched according to the movement state of the dump truck 1. For example, it is possible for the camera image of the first camera and the bird's-eye image F to be displayed during forward progression and when stationary and only the camera image 16G of the sixth camera 16 to be displayed during backward progression. Furthermore, the camera image 16G and the bird's-eye image F may be displayed during backward progression and the camera image 16G and another camera image may be displayed during backward progression.

Display Control Section

The display control section 40 selects camera image data which corresponds to the camera image which has been selected based on the notification from the operator switch 20. In addition, the display control section 40 generates bird's-eye image data where the plurality of images are videoed from a predetermined projected plane due to conversion of the coordinates of the camera image data of the six cameras 11 to 16 and which shows the bird's-eye image F which encompasses the entire surroundings of the dump truck 1. The display control section 40 generates two-screen data which corresponds to a two-screen image where the camera image which has been selected and the bird's-eye image F are lined up due to the combination of the camera image data and the bird's-eye image data.

In addition, the display control section 40 generates vehicle body outer edge line data which corresponds to a vehicle body outer edge line BL showing the outer edges of the vehicle body (including the vehicle body frame 2 and the vessel 4) which is vertically projected with regard to the ground surface in the camera image which has been selected. The display control section 40 generates the vehicle body outer edge line data according to distortions of the camera image of a target camera in accordance with a sequence which will be described next.

First, the display control section 40 defines three vectors Ra, Rb, and Rc which indicate the orientation of the target cameras based on the following formulae (1) to (3).

Formulae (1) to (3)

$$Ra = \begin{pmatrix} 1 & 0 & 0 \\ 0 & ca & sa \\ 0 & -sa & ca \end{pmatrix} \quad (1)$$

$$Rb = \begin{pmatrix} cb & 0 & -sb \\ 0 & 1 & 0 \\ sb & 0 & cb \end{pmatrix} \quad (2)$$

$$Rc = \begin{pmatrix} cc & sc & 0 \\ -sc & cc & 0 \\ 0 & 0 & 1 \end{pmatrix} \quad (3)$$

Here,
ca=cos(roll), sa=sin(roll)
cb=cos(pitch), sb=sin(pitch)
cc=cos(yaw), sc=sin(yaw)
where
roll is the deflection angle of the target camera around an axis which is parallel with the front and back direction,
pitch is the deflection angle of the target camera around an axis which is parallel with the vehicle width direction,
yaw is the deflection angle of the target camera around an axis which is parallel with the vertical direction, and
pitch, roll, and yaw are stored in a memory which is built into the display control section 40.

Next, the display control section 40 converts the three-dimensional coordinates (Xr, Yr, Zr) at one point on the outer edge of the vehicle body, which is vertically projected with regard to the ground surface, in a physical coordinates system to three-dimensional coordinates (x, y, z) in a camera coordinates system where the orientation and the position of the target camera is a reference as an Euler angle in the vertical direction—front and back direction—vehicle width direction based on the following formula (4).

Formula (4)

$$\begin{pmatrix} x \\ y \\ z \end{pmatrix} = RaRbRc \left( \begin{pmatrix} Xr \\ Yr \\ Zr \end{pmatrix} - \begin{pmatrix} tx \\ ty \\ tz \end{pmatrix} \right) \quad (4)$$

Here, (tx, ty, tz) are coordinates in the physical coordinates system of the target camera.

Next, the display control section 40 converts the three-dimensional coordinates (x, y, z) in the camera coordinates system to two-dimensional coordinates (u, v) in the display region 30a of the monitor 30 based on the following formulae (5) to (11).

Formulae (5) to (11)

$$x2=x/z \quad (5)$$

$$y2=y/z \quad (6)$$

$$r^2=x2^2+y2^2 \quad (7)$$

$$x3=x2(1+k1*r^2+k2*r^4+k3*r^6)+2*p1*x2*y2+p2(r^2+2*x2^2) \quad (8)$$

$$y3=y2(1+k1*r^2+k2*r^4+k3*r^6)+p1(r^2+2*y2^2)+2*p2*x2*y2 \quad (9)$$

$$u=fx*x3+cx \quad (10)$$

$$v=fy*y3+cy \quad (11)$$

Here, k1, k2, and k3 are radial direction strain coefficients,
P1 and p2 are shear direction strain coefficients,
fx and fy are camera focal distances, and
cx and cy are camera coordinate systems with the focal direction of the camera as the Z axis, the imaging plane direction as the X axis and the Y axis.

In this manner, the display control section 40 acquires the two-dimensional coordinates (u, v) at one point on the outer edge of the vehicle, which is vertically projected with regard to the ground surface, in the display region 30a. The display control section 40 generates the vehicle body outer edge line data which corresponds to the vehicle body outer edge line BL with a desired form (a dashed line, a chain line, or the like) by acquiring the two-dimensional coordinates in the same manner with regard to a plurality of points on the outer edges of the vehicle body.

In addition, the display control section 40 generates warning line data which corresponds the a first to a third warning lines L1 to L3 which indicate positions with predetermined distances on the outside from the vehicle body outer edge line BL using the formulae (1) to (11) described above in the same manner. In the embodiment, the first warning line L1 is a line which is 3 m to the outside of the vehicle body outer edge line BL, the second warning line L2 is a line which is 5 m to the outside of the vehicle body outer edge line BL, and the third warning line L3 is a line which is 7 m to the outside of the vehicle body outer edge line BL.

The display control section 40 generates display image data by overlapping the two-screen data which has been generated, the vehicle body outer edge line data which has been generated, and the warning line data which has been generated. The display control section 40 transmits the display image data which has been generated to the monitor 30. Due to this, the vehicle body outer edge line BL, which indicates the outer edges of the vehicle body which is vertically projected with regard to the ground surface, and the first to the third warning lines L1 to L3, which indicates the lines which are 3 m, 5 m, and 7 m more to the outside of the vehicle body than the vehicle body outer edge line BL, are displayed along with the camera images 15G and 16G on the monitor 30 as shown in FIG. 6 and FIG. 7.

Actions and Effects (1) The periphery monitoring apparatus 10 is provided with the display control section 40 which displays the camera image and the vehicle body outer edge line BL, which indicates the outer edges of the vehicle body (including the vessel 4) which is vertically projected with regard to the ground surface in the camera image, on the monitor 30.

Accordingly, it is possible for the driver to easily grasp the positional relationship of the vehicle body which is positioned above the camera and an object (for example, a person, a vehicle, a building, or the like) in the periphery of the vehicle body with the vehicle body outer edge line as a reference. As a result, it is possible to easily determine using the camera image, for example, if a person has entered the space below the vehicle body, to what extent that the vehicle body has approached a building, or the like. As a result, it is possible for the driver to simply grasp the circumstances in the periphery of the dump truck 1.

(2) The display control section 40 displays the first to the third warning lines L1 to L3, which indicate positions with predetermined distances from the vehicle body outer edge line BL, on the monitor 30.

Accordingly, it is possible for the driver to more easily grasp the positional relationship of the vehicle body and objects in the periphery of the vehicle body since to what extent objects in the periphery of the vehicle body are separated from the vehicle body is shown in a stepped manner with the vehicle body outer edge line BL as a reference.

(3) The ground surface is included in the lower part of the screen in the imaging range 16R of the sixth camera 16 as shown in FIG. 6, and the lower surface side of the rear edge portion of the vessel 4 which configures a portion of the vehicle body is included in an upper part of the screen which opposes the ground surface.

Accordingly, it is possible for the driver to more clearly grasp the positional relationship of the vessel and objects in the periphery of the vessel since it is possible for the rear edge portion of the vessel 4 to be directly confirmed in the camera image 16G.

Other Embodiments

The present invention is not limited to the embodiment as described above and various changes and modifications which do not depart from the scope of the invention are possible.

(A) In the embodiment described above, the display control section 40 displays the first to the third warning lines L1 to L3 on the monitor 30 but the present invention is not limited to this. The display control section 40 may display any of the first to the third warning lines L1 to L3, and in addition, may display four or more warning lines.

(B) In the embodiment described above, the display control section 40 shows the vehicle body outer edge line BL and the first to the third warning lines L1 to L3 with dashed lines but the present invention is not limited to this. The display control section 40 may show the vehicle body outer edge line BL and the first to the third warning lines L1 to L3 with a solid line, a chain line, or the like. In addition, the display control section 40 may show each of the vehicle body outer edge line BL and the first to the third warning lines L1 to L3 with different colors.

(C) In the embodiment described above, the case is described where the vehicle body outer edge line BL is displayed along with the camera image 16G of the sixth camera 16 or the camera image 15G of the fifth camera 15 using FIG. 6 and FIG. 7 but the present invention is not limited to this. The vehicle body outer edge line BL may be displayed along with the camera images of the first to the fourth cameras in a case where the driver specifies any of the first to the fourth cameras 11 to 14.

(D) In the embodiment described above, the dump truck 1 is provided with the base 7 but need not be provided with the base 7.

(E) In the embodiment described above, the dump truck 1 is provided with six cameras 11 to 16 but the present invention is not limited to this. The dump truck 1 may be provided with one to five cameras or may be provided with seven or more cameras.

What is claimed is:

1. A dump truck comprising:
   a vehicle body;
   a vessel movably connected to the vehicle body; and
   a periphery monitoring apparatus adapted to display an image of surroundings of the dump truck on a display apparatus, the periphery monitoring apparatus including
      a plurality of cameras configured and arranged to capture camera images of the surroundings of the dump truck, the plurality of cameras including a rearward camera that is attached to the vehicle body of the dump truck so as to be disposed underneath the vessel of the dump truck and positioned forward of a rear edge portion of the vessel, the rearward camera being configured and arranged such that a rearward camera image captured by the rearward camera includes the rear edge portion of the vessel, an area below the vessel, and an area rearward of the vehicle body; and
      a display control section configured to display a vehicle body outer edge line superimposed on the rearward camera image, the vehicle body outer edge line being obtained by vertically projecting an outer edge of the vessel onto a ground surface based on a vehicle body outer edge line data generated by vertically projecting the outer edge of the vessel onto the ground surface, the outer edge of the vessel being defined by a mounting position of the rearward camera and a position of the vessel.

2. The dump truck according to claim 1, wherein
   the display control section is further configured to display a bird's eye image of the surroundings of the dump truck based on the camera images captured by the plurality of cameras, and to display a selected one of the camera images adjacent to the bird's eye image.

3. The dump truck according to claim 1, wherein
   a horizon line is captured in the rearward camera image,
   the rear edge portion of the vessel is displayed above the horizon line in the rearward camera image, and
   the vehicle body outer edge line is displayed below the horizon line in the rearward camera image.

4. The dump truck recited in claim 1, wherein
   a trapezoidal shape is displayed on the rearward camera image, the trapezoidal shape being formed by the vehicle body outer edge line, a pair of reference lines indicating a vehicle width, and a warning line spaced from the vehicle body outer edge line by a prescribed distance in an outward direction.

5. The dump truck recited in claim 1, wherein
   the vehicle body outer edge line is spaced from the rear edge portion of the vessel in the rearward camera image.

* * * * *